United States Patent
Ritzow

[15] 3,671,816
[45] June 20, 1972

[54] TIME DELAY CONTROL SYSTEM FOR DIRECTIONAL RELAYS WITH ELECTRICAL INTERLOCK

[72] Inventor: Gerald R. Ritzow, Racine, Wis.
[73] Assignee: Cutler-Hammer, Inc., Milwaukee, Wis.
[22] Filed: May 21, 1970
[21] Appl. No.: 39,414

[52] U.S. Cl............................317/136, 307/115, 317/137, 317/141 S, 340/147 LP
[51] Int. Cl.......................................................H01h 47/22
[58] Field of Search...............317/137, 155, 157, 148.5, 141, 317/142, 136; 307/115; 340/147 C, 147 LP; 318/280, 285, 287, 289, 290

[56] References Cited
UNITED STATES PATENTS

| | | | |
|---|---|---|---|
| 3,490,027 | 1/1970 | Galetto et al. | 321/11 X |
| 3,441,809 | 4/1969 | Newland | 317/137 X |
| 3,144,568 | 8/1964 | Silliman et al. | 317/142 S |

Primary Examiner—William M. Shoop, Jr.
Assistant Examiner—Harry E. Moose, Jr.
Attorney—Hugh R. Rather

[57] ABSTRACT

A solid state control circuit for completing selectively energizing circuits for the operating coils of directional relays in a motor control system which affords a predetermined time delay on energization for each relay, and electrical lockout against simultaneous energization of one relay operating coil while the other remains energized and vice versa.

3 Claims, 3 Drawing Figures

PATENTED JUN 20 1972 3,671,816

TIME DELAY CONTROL SYSTEM FOR DIRECTIONAL RELAYS WITH ELECTRICAL INTERLOCK

This invention pertains to an improved solid state control circuit for relays used for controlling the direction of operation of a motor or the like.

Another object is to provide a motor control system of the aforementioned type which is characterized of permitting selective time delayed energization of each relay, coupled with electrical interlock against simultaneous energization of one relay while the other remains energized.

Other advantages of the invention will hereinafter appear.

DESCRIPTION OF THE PREFERRED EMBODIMENT

Figure 3:
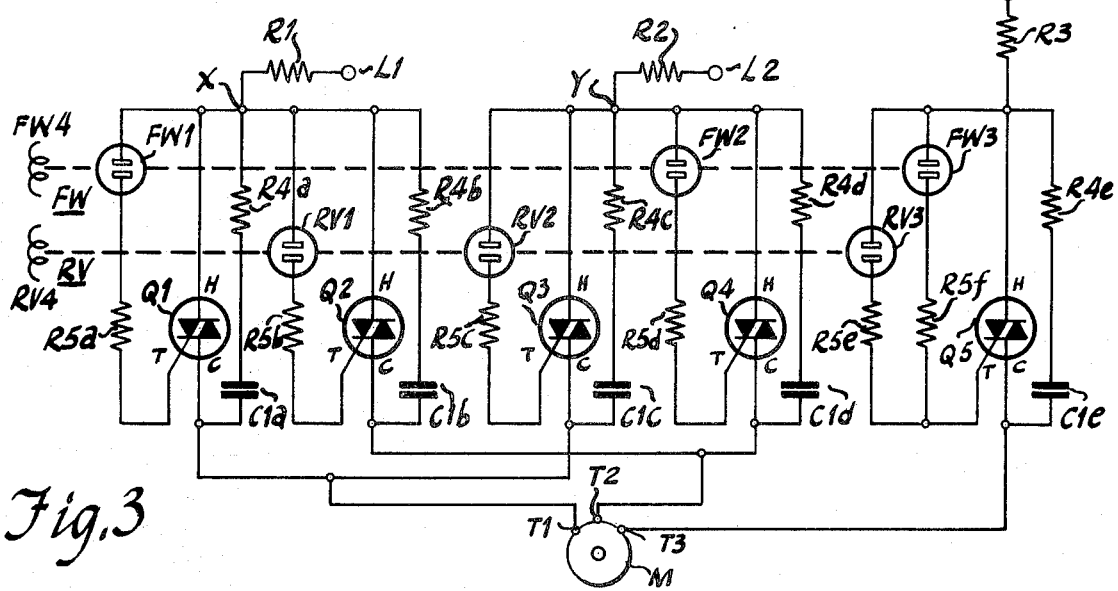
FIG. 3 is a diagrammatic showing of a motor control system which uses the directional control relay systems of FIGS. 1 and 2.

Referring to FIG. 3 it shows a control system for energizing a polyphase a.c. induction motor M for operation in either forward or reverse directions from a polyphase A.C. voltage source comprising supply lines L1, L2 and L3. More particularly in the control system, the primary terminal T1 of motor M is connected in series with the main conducting path of a bilateral thyristor triode Q1 of the type commonly sold under the trade name of "Triac" or "Quadrac", and a current limiting resistor R1 to line L1. Terminal T1 is also connected in series with a Triac Q3 and a current limiting resistor R2 to L2. Terminal T2 of motor M is connected in series with a Triac Q2 and resistor R1 to line L1, and is also connected in series with a Triac Q4 and resistor R2 to line L2. Terminal T3 of motor M is connected in series with Triac Q5 and a current limiting resistor R3 to line L3.

Each of the triacs Q1 to Q5 has a capacitor C1a to C1e, respectively and a resistor R4a to R4e, respectively connected in series across its main conducting path for $dv/dt$ compensation in a well known manner. The control electrode of Q1 is connected in series with a resistor R5a and the normally open contacts FW1 of a relay FW to the point X common between resistor R1 and the terminal H of triac Q1. Similarly, control electrode of triac Q2 is connected in series with a resistor R5b and normally open contacts RV1 of a relay RV to such common point X. The control electrode of a triac Q3 and Q4 are similarly connected through resistors R5c and R5d and contacts RV2 and FW2 of relays RV and FW respectively to the point "Y" common between resistor R2 and the terminals H of Q3 and Q4. The control electrode of Q5 is connected through parallel branches each of which contains a respective resistor R5e and R5f and respective contacts FW3 and RV3 of relays FW and RV to the point common between resistor R3 and terminal H of Q5.

Relay FW has an electromagnetic energizing coil FW4 and relay RV has a similar energizing coil RV4. It may be assumed that when coil FW4 is energized that contacts FW1 to FW3 close to subject the control electrodes T of triacs Q1, Q4 and Q5 to a firing voltage at or shortly after the beginning of each cycle in the a.c. supply voltage wave. With these triacs so conducting in each half-cycle it may be assumed that motor M will operate continuously in the forward direction until such time as relay FW is deenergized. It will be seen that with coil RV4 of relay RV alternatively energized, that triacs Q2, Q3 and Q5 will be continuously energized to cause motor M to operate in the reverse direction.

Figure 1:
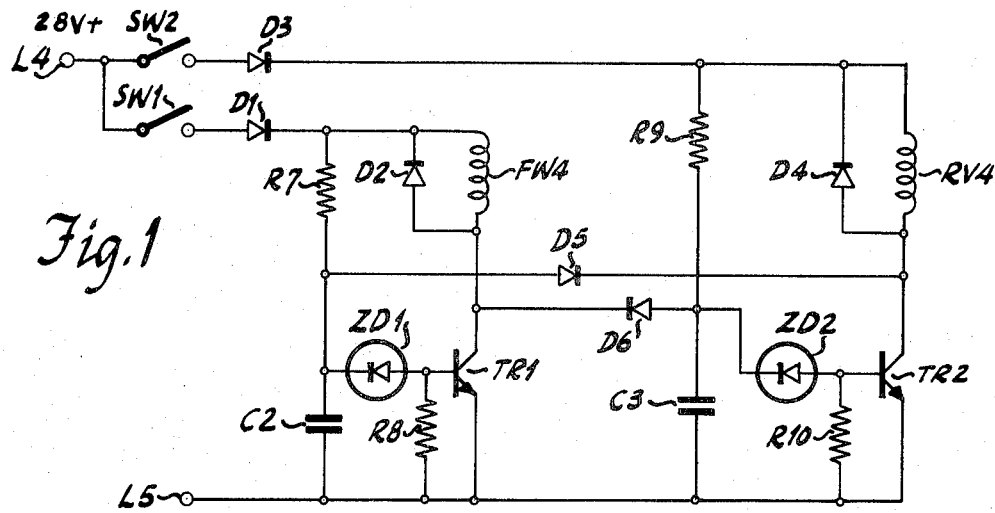
FIG. 1 is a diagrammatic showing of an improved control system for the operating coils of directional relays constructed in accordance with the invention.

In FIG. 1 there is disclosed a preferred form of control for effecting selective time delayed energization of either of the relays FW and RV with inherent electrical interlock action preventing simultaneous energization of both relay energizing coils. As shown the control uses a d.c. energizing source comprising d.c. voltage supply lines L4 and L5.

A manual switch SW1 is connected from line L4 in series with a half-wave rectifier or diode D1, coil FW4 or relay FW and the collector-emitter circuit of an NPN type transistor TR1 to line L5. A diode D2 is connected across coil FW4 in opposed conducting relation to diode D1. A series R/c circuit comprising a resistor R7 and a capacitor C2 is connected from the point common between diodes D1 and D2 and coil FW4 to line L5. A zener diode ZD1 is connected from the base of transistor TR1 and the point common between resistor R7 and capacitor C2.

It will be seen that when switch SW1 is closed, the lines L4 and L5 are energized, that current will flow through diode D1, resistor R7 into capacitor C2 thereby charging capacitor C2. When the charge potential of C2 rises to the zener voltage of ZD1, current will then flow into the base of transistor TR1 and render the latter conducting. When TR1 conducts current flows through coil FW4 and the collector-emitter circuit of TR1 to line L5 thereby energizes coil FW4 to pick up the contacts FW1 to FW3 to effect forward operation of motor M as aforedescribed in connection with FIG. 3.

Referring again to FIG. 1, it will be seen that another circuit, exactly like that above described for coil FW4, is also provided for coil RV4 of relay RV. In the latter circuit, the switch SW2, diode D3, resistor R9, capacitor C3, transistor TR2, diode D4, zener diode ZD2, and resistor R10 are exact duplicates and function in the same manner as switch SW1, diode D1, resistor R7, capacitor C2, zener diode ZD1 and resistor R8 respectively. Thus, when switch SW2 is closed, and SW1 is open, coil RV4 will be energized after a time delay to close contacts RV1 to RV3 and afford energization of the motor M in FIG. 3 for reverse operation.

Whenever either of the switches SW1 or SW2 is opened to deenergize the coils FW4 and RV4, the diodes D2 and D4 afford protection for the transistors TR1 and TR2. These diodes provide a low impedance shunt path so that the inductive energy stored in coils FW4 and RV4 is not imposed on the collector-emitter circuit of the transistors.

The electrical interlock portion of the control comprises a half-wave rectifier or diode D5 connected at its high potential terminal to the point common between resistor R7, capacitor C2 and zener diode ZD1 in the R/c circuit and at its other end to the point common between the collector of transistor TR2 and relay coil RV4. It further comprises a similar diode D6 connected at its high potential terminal to the point common between R9, capacitor C3 and zener diode ZD2, and at its low potential terminal to the point common between relay coil FW4 and the collector of transistor TR1.

Let it be assumed that switch SW1 is closed, relay coil FW4 is energized and motor M in FIG. 3 is energized and running in the forward direction. Now, if switch SW2 is closed while switch SW1 remains closed, such closure of switch SW2 will be ineffective to energize relay coil RV4. With transistor TR1 conducting, any current flowing through resistor R9 as a result of closure of switch SW2 under such conditions will not flow into capacitor C3, but rather bypasses such capacitor and flows through diode D6 and the collector-emitter circuit of transistor TR1 to line L5. Consequently, capacitor C3 cannot then charge to a potential at which zener diode ZD2 will conduct, and transistor TR2 will thus be prevented from conducting to energize relay coil RV4.

The foregoing will hold true so long as switch SW1 remains closed. If switch SW1 is thereafter opened while SW2 is closed, it will be apparent that transistor TR2 will conduct after a time delay period, as aforedescribed in connection with transistor TR1 and effect energization of relay coil RV4 to cause operation of motor M in FIG. 3 in the reverse operating direction.

It will be apparent that if switch SW2 is closed and switch SW1 is thereafter closed that the electrical interlock parts including diode D5 will prevent energization of transistor TR1. Due to TR2 then being conducting, current flowing through resistor R7 will by-pass capacitor C2 and flow through the collector-emitter circuit of TR2, to line L5 thereby preventing TR1 from being rendered conducting to energize relay coil FW4.

As aforeindicated, the R/C circuit provides a minimum time delay for energization of the relay coils FW4 and RV4 after their associated manual switch SW1 and SW2 close. This is provided to insure completion of reopening of contacts of one relay before the contacts of the other can be closed.

Figure 2:
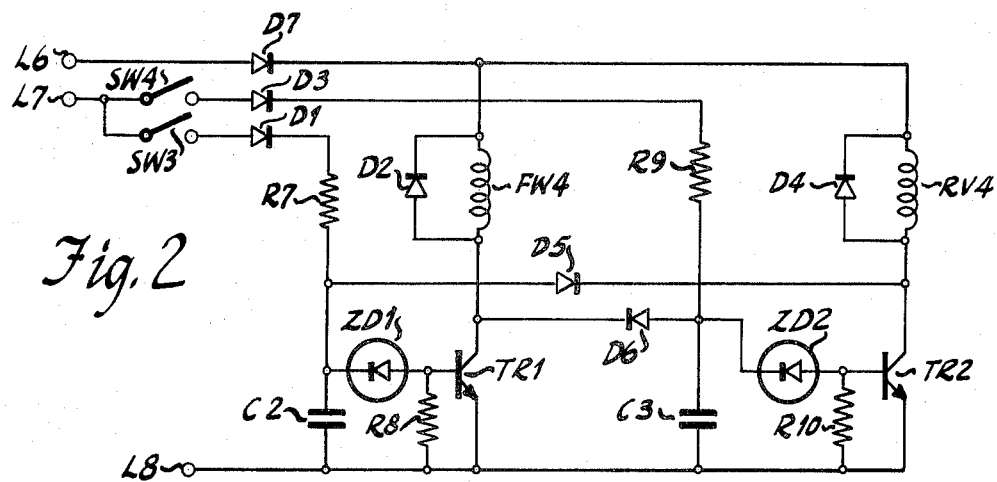
FIG. 2 is a diagrammatic showing of a modified version of the control system.

FIG. 2 depicts a somewhat modified version of the control aforedescribed in connection with FIG. 1. In the modified version like components bear the same reference numerals as their counterpart in the control of FIG. 1. The principal difference in the modified version is that the upper ends of relay coils FW4 and RV4 are connected to a separate positive d.c. line L6 while the R/C circuits associated therewith are selectively connectable to a positive d.c. line L7 which is positive but of a somewhat lower potential with respect to the negative or common line L8. As will be noted, a switch SW3 when closed permits completion of circuit from line L7 through diode D1 to the R/C circuit associated with transistor TR1 to render the latter conducting after the time delay interval. Similarly, if the other switch SW4 is closed, the R/C circuit associated with transistor TR2 will be connected to line L7 through diode D3 to render transistor TR4 conducting after a time delay period.

It will be apparent that the electrical interlock features of the FIG. 2 version are exactly the same as that for the control of FIG. 1 and may be assumed to function in exactly the same way. The version of FIG. 2 has the advantage of requiring less power to effect conduction of either of the transistors TR1 or TR2.

I claim:

1. The combination with a source of D.C. voltage supply and a pair of electromagnetic relays or the like, of a pair transistors each having its collector-emitter circuit connected in series with the operating winding of an individual one of said relays to one side of said source, like R/C circuits each of which is connected to said one side of said source and each being connected in circuit with the base of a transistor individual thereto, switch means operable to complete energizing connections from said source through each of said associated R/C and transistor-relay operating circuits selectively to afford time delay energization of a selected relay operating winding, and electrical interlock means comprising like means each of which is in circuit with an R/C circuit individual thereto and the collector of the transistor whose base is not in circuit with such R/C circuit, each of said last mentioned means acting when the transistor with whose collector it is connected is conducting to prevent the R/C circuit with which it is connected from rendering the other transistor conducting.

2. The combination according to claim 1 wherein said R/C circuits each comprise a resistor and capacitor connected in series and a zener diode connected between the base of its associated transistor and the junction between said resistor and said capacitor.

3. The combination according to claim 2 wherein said like means of said interlock means each comprises a half-wave rectifier connected to permit current flow from the junction of the resistor and capacitor of an R/C circuit to the collector of the transistor not associated with said R/C circuit but not in the reverse direction.

* * * * *